S. P. SHIPLEY.

Bee Hive.

No. 78,898.

Patented June 16, 1868.

Witnesses.
J. H. Burridge
K. Coon

Inventor:
S. P. Shipley.

United States Patent Office.

S. P. SHIPLEY, OF OLENA, OHIO.

Letters Patent No. 78,898, dated June 16, 1868.

IMPROVEMENT IN BEE-HIVE.

*The Schedule referred to in these Letters Patent and making part of the same.*

TO ALL WHOM IT MAY CONCERN:

Be it known that I, S. P. SHIPLEY, of Olena, in the county of Cuyahoga, and State of Ohio, have invented certain new and useful Improvements in Bee-Hives; and I do hereby declare that the following is a full and complete description of the same, reference being had to the accompanying drawings, making a part of this specification, in which—

Figure 1:
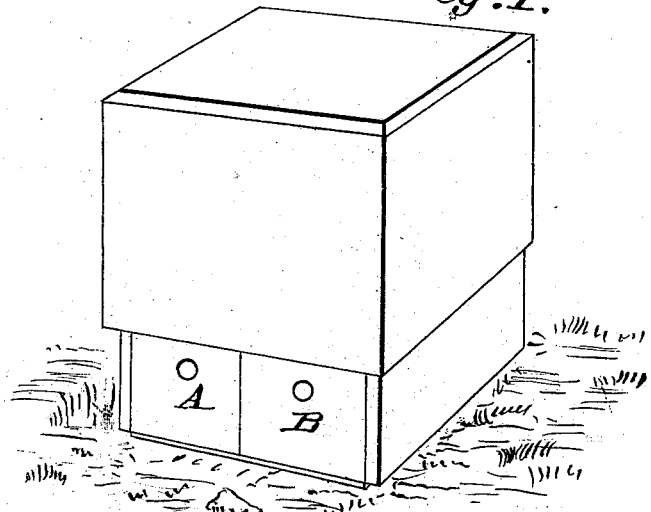
Figure 2:
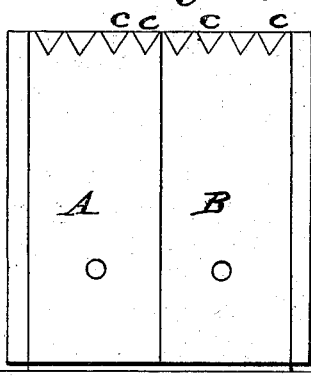
Figure 3:
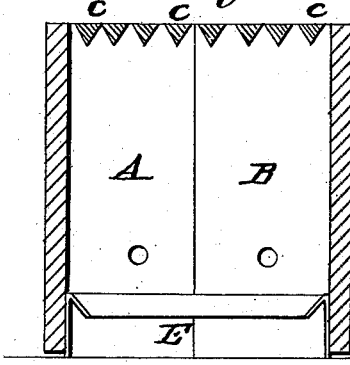
Figure 4:
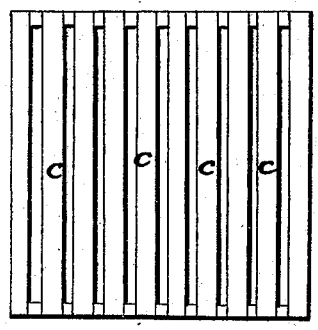

Figure 1 is a perspective view of the hive.
Figure 2, a detached section.
Figure 3, a vertical transverse section.
Figure 4, a view of the top.
Like letters of reference refer to like parts.

The nature of this invention consists in constructing a box-hive in sections, so that the said hive can be divided for the convenience of swarming, and also providing the hive with comb-bars, for the purpose of separating the comb on dividing the hive.

Fig. 2 represents the box or body of the hive, which is constructed in two parts, A B. This box, it will be observed, is of the shape of the common box-hive, with the difference only that it is made in two parts, and, instead of a close tight top or cover, it is provided with a series of cross-bars, C, fig. 4, arranged transversely from the back to the front, an equal number of bars being in each section, and which, it will be seen, are parallel with the division. D is a cap or hood, made to fit down over the top of the hive, thereby protecting the top and inside of the hive from storm. It also adds to the warmth of the hive in winter, but which may be removed in the summer, and the top covered with a board in the ordinary way.

It is well understood by those keeping bees that the young swarm will not leave the parent hive if there is room enough for the accommodation of the old and young swarms, the want of room being the cause of the separation and flight of the new brood; hence, in order to prevent the young brood from going off, I take away a section of the hive, which may be either of the sections A B, as circumstances may determine. The comb in the hive being attached to the parallel bars, and built downward in distinct separate sheets, it is easily separated without injury to the comb, and with little disturbance to the bees.

On removing a section of the hive, an empty section is placed in the room of the one taken away, and, to the full section removed, is attached an empty one, thereby making two hives; a section of each being a part of the old hive, to which is added a new and open apartment in which the bees can work. By this means, the young swarm is retained at home, and hence the trouble of hunting them, after they may have left the hive for new quarters, as they always do in the ordinary hive, is avoided.

I am aware that hives have been made with a view of their extension, for the purpose above set forth, but those hives are arranged in a bee-house, each hive being a separate and distinct thing of itself, having no transverse parallel bars for dividing the comb; but this arrangement I do not claim. But that which distinguishes my invention from all others is, the use of a common box-hive, divided in the manner described, and provided with transverse bars, on which the bees may build their comb, so that the hive may be separated without breaking the comb or disturbing the bees.

I also provide a bee-moth guard, for the exclusion of the insect so destructive to the interests of bee-culture. This guard consists of a projecting flange, of tin or other suitable material, E, fig. 3, near the bottom of the hive. This flange is bent downward and outward, at an acute angle, so that the moth, on ascending the sides of the box, is prevented from going far upward by the flange, over which it cannot pass, and hence is compelled to remain near the bottom of the hive, under which the bees constantly pass and repass, and thereby dislodge the insect, and eject it from the hive.

What I claim as my improvement, and desire to secure by Letters Patent, is—

The parts A and B, constructed with slotted top, combined with each other and with the cap D, as and for the purpose substantially as set forth.

S. P. SHIPLEY.

Witnesses:
J. H. BURRIDGE,
K. COON.